Oct. 6, 1964  J. R. BROWNELL  3,151,797
FESTOONING APPARATUS
Filed March 15, 1962  6 Sheets-Sheet 3

INVENTOR.
John R. Brownell,
BY
Paul & Paul
ATTORNEYS.

INVENTOR.
John R. Brownell,
BY
Paul & Paul
ATTORNEYS.

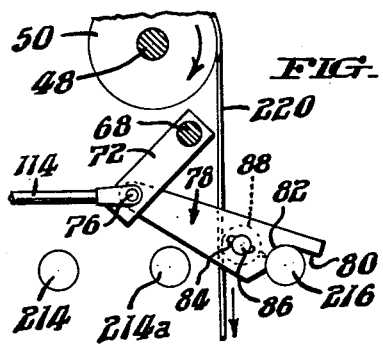
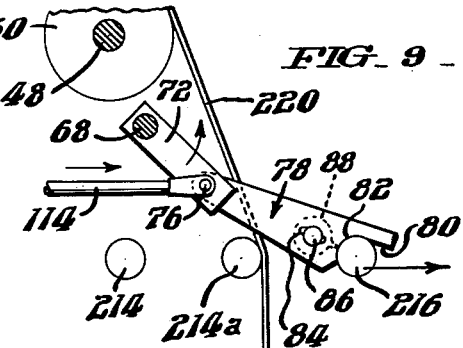
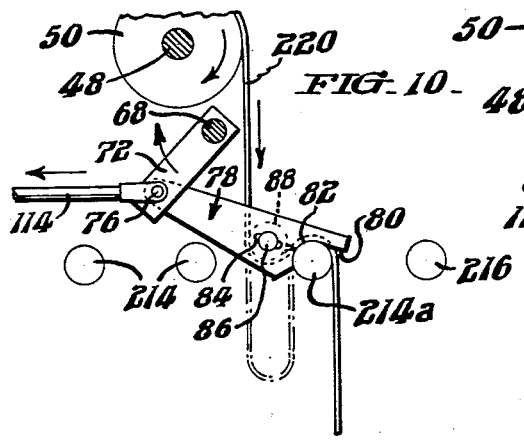
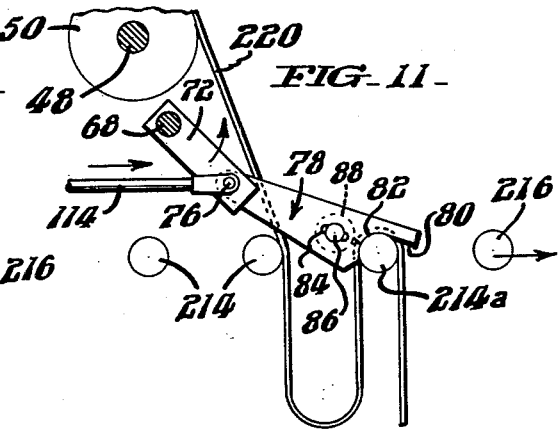
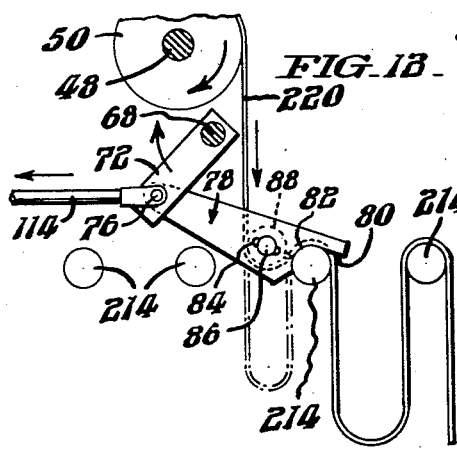
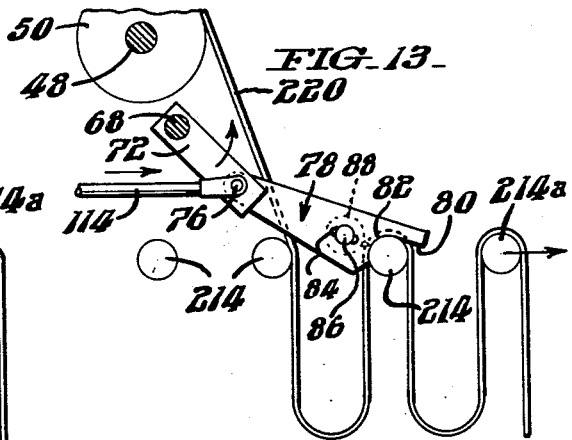
INVENTOR.
John R. Brownell,
BY
Paul & Paul
ATTORNEYS.

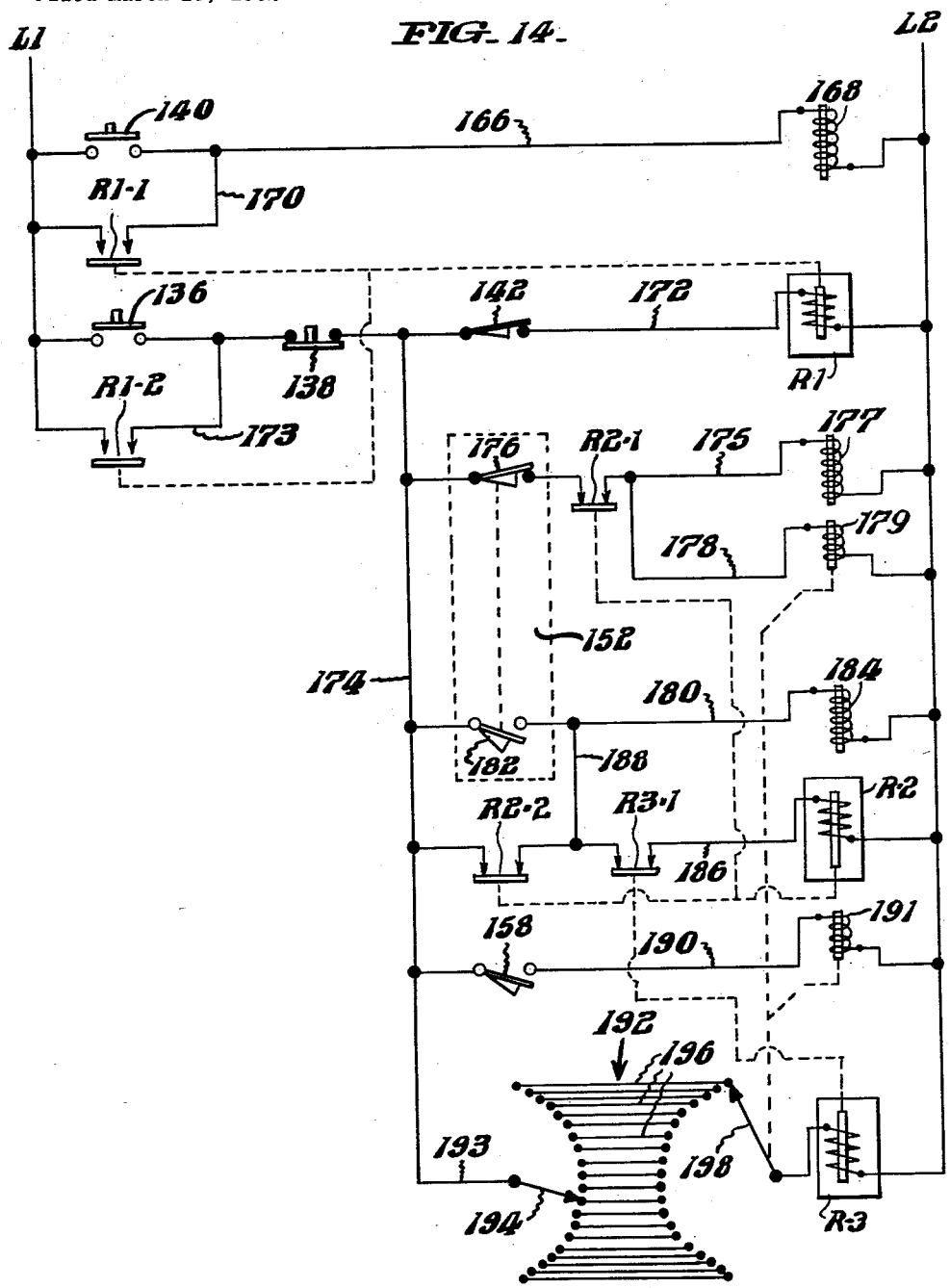

3,151,797
FESTOONING APPARATUS
John R. Brownell, Telford, Pa., assignor to Turbo
  Machine Company, Lansdale, Pa., a corporation of
  Pennsylvania
Filed Mar. 15, 1962, Ser. No. 179,940
4 Claims. (Cl. 226—107)

This invention relates generally to apparatus for handling a web of material, and particularly to apparatus for storing a web of material in the form of depending loops or festoons.

An important object of the invention is to provide improved apparatus for laying a web of material in the form of depending loops or festoons over a series of laterally spaced horizontally extending bars for storage thereof.

Another object is to provide apparatus for hanging a web of material in the form of depending loops or festoons upon a mobile rack.

Another object is to provide apparatus for successively loading sections of a web of material, in the form of loops or festoons, respectively upon a series of mobile racks.

Other objects of the invention will become apparent when the following description is read with reference to the accompanying drawings, in which:

FIGURE 4 is an enlarged fragmentary perspective view looking at an upper corner at the rear of the apparatus;

FIGURE 5 is an enlarged exploded view of a part of the apparatus;

FIGURES 8 to 13 are schematic views illustrating formation of the festoons; and

FIGURE 14 is a wiring diagram.

Figure 1:
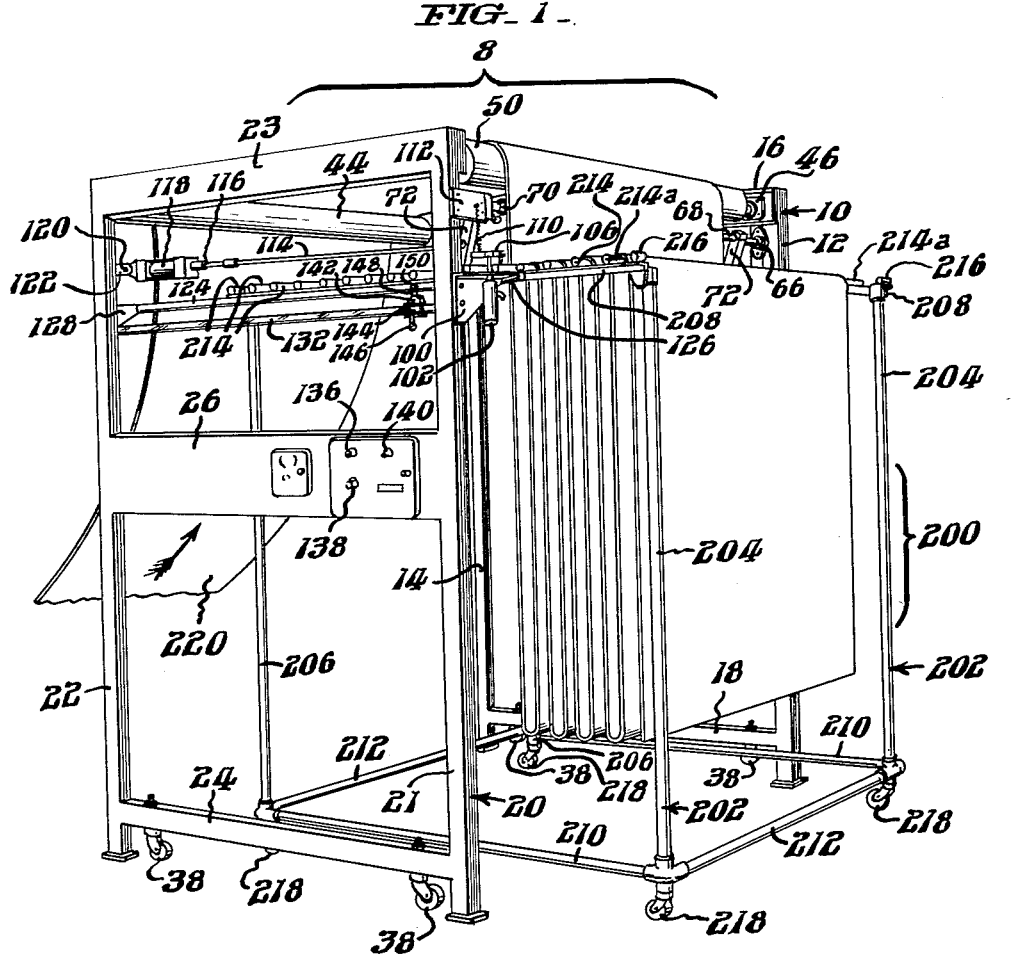
FIGURE 1 is a perspective view looking at the front and left hand side of apparatus constructed in accordance with the invention, a rack being shown partially loaded.
Figure 2:
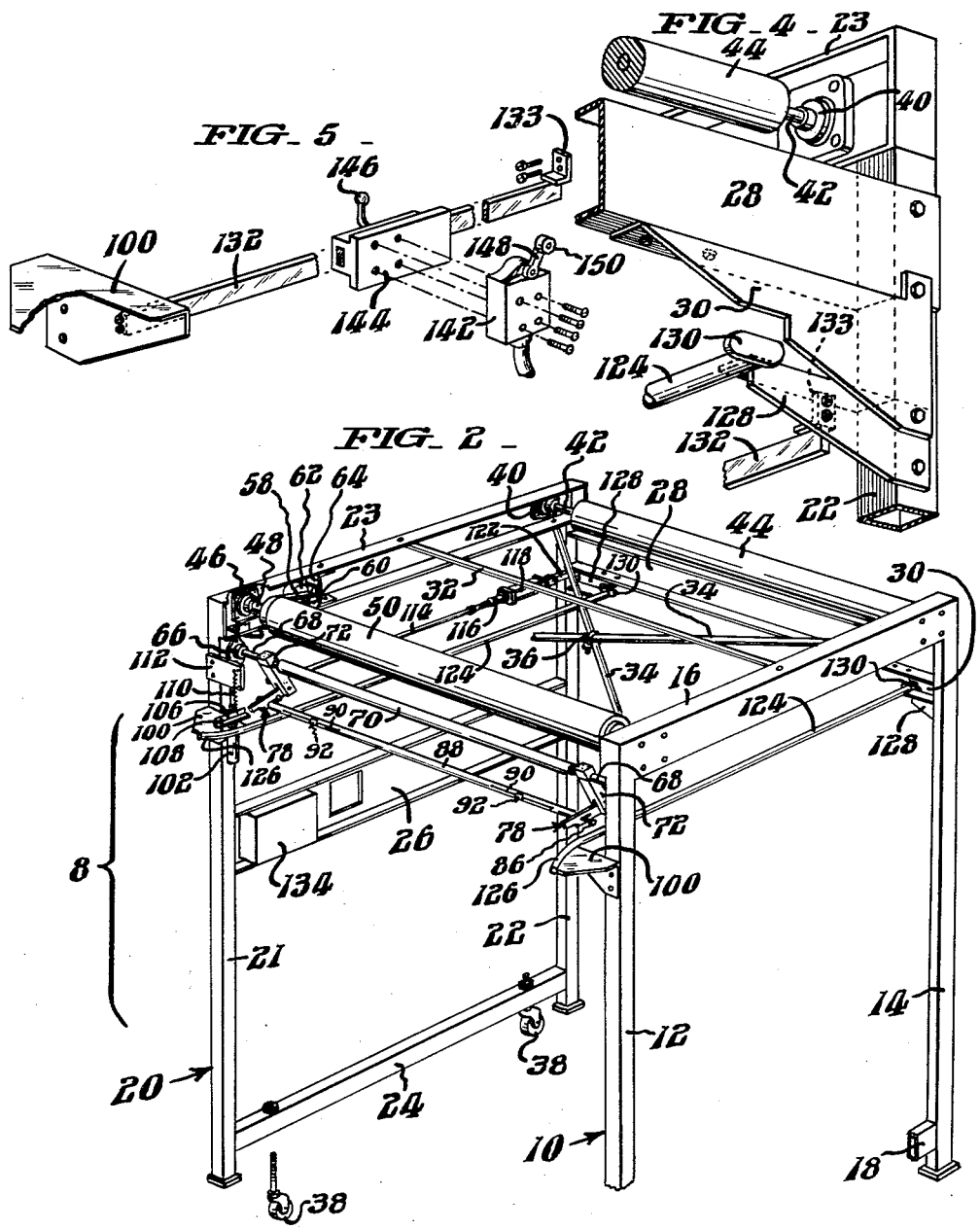
FIGURE 2 is a perspective view looking at the front, right hand side and top of the apparatus, apart from any rack, parts being broken away, omitted or positioned to clarify the construction.

Referring particularly to FIGURES 1, 2 and 4, the apparatus, generally designated 8, includes a rigid frame 10 on the right hand side thereof. The frame is provided with a corner post 12 at the front of the apparatus and a corner post 14 at the rear of the apparatus. Tying the upper ends of the posts 12 and 14 together is a horizontally extending member 16, and tying the lower ends of the posts 12 and 14 together is a horizontally extending member 18. The apparatus also includes a rigid frame 20 on the left hand side thereof. The frame is provided with a corner post 21 at the front of the apparatus and a corner post 22 at the rear of the apparatus. Tying the upper ends of the posts 21 and 22 together is a horizontally extending member 23, and tying the lower ends of the posts 21 and 22 together is a horizontally extending member 24. Intermediate the members 23 and 24 is a horizontally extending member 26 tying corresponding portions of the posts 21 and 22 together. Extending across the rear of the apparatus and tying the upper end portions of the posts 14 and 22 together is a member 28 having at each end a bracket 30. Between the front and rear of the apparatus is a horizontally extending tie rod 32 tying corresponding portions of the horizontally extending members 16 and 23 together. Also tying the members 16 and 23 together are a pair of cross rods 34 interconnected by a U-clamp 36. Each of the frames 10 and 22 is provided with casters 38.

Referring particularly to FIGURE 2, at the top and rear of the apparatus are a pair of bearings 40 respectively mounted upon the members 16 and 23. Revolvably received by the bearings 40 are the opposite end portions of a shaft 42, which carries a roller 44 for a purpose to appear.

Figure 3:
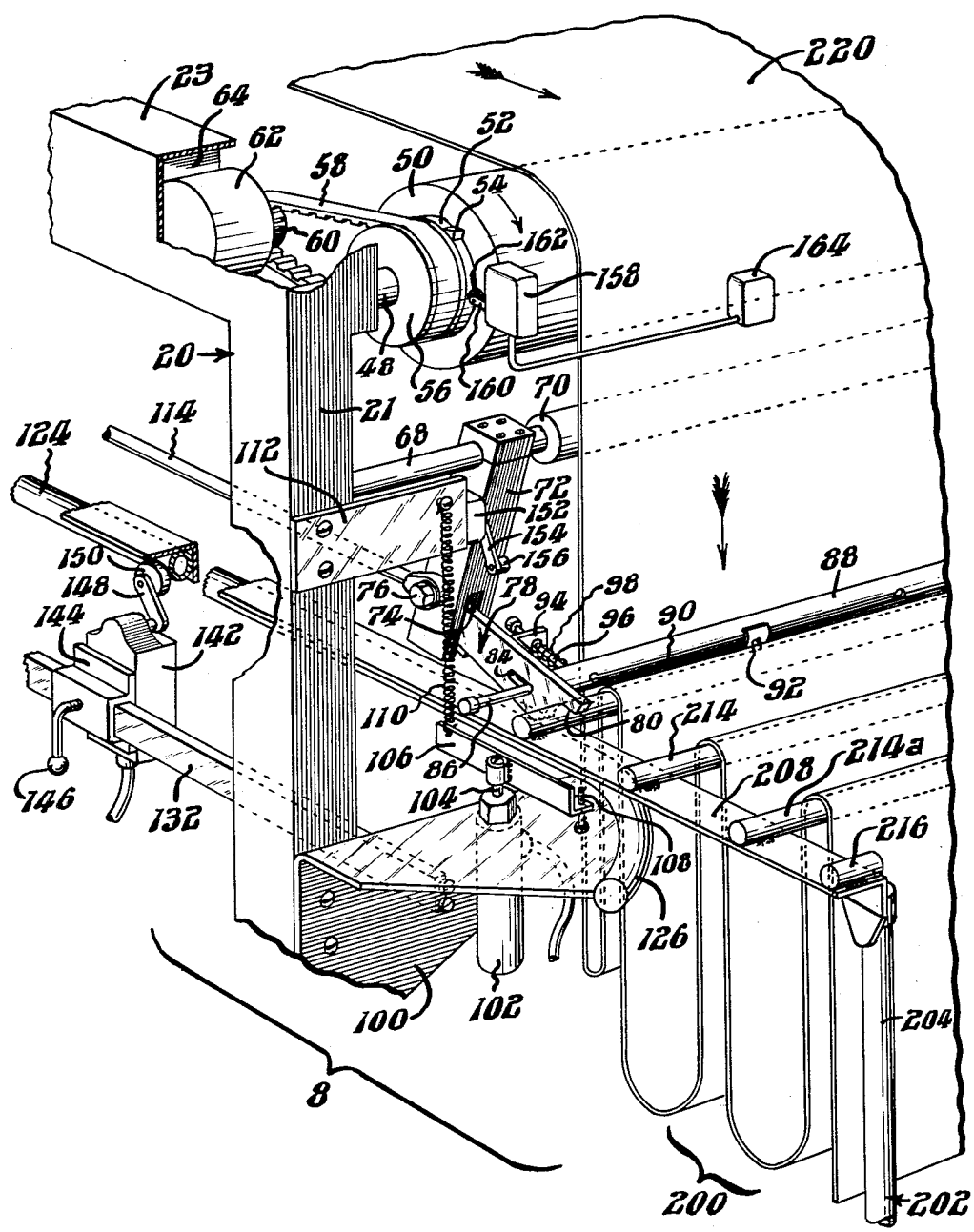
FIGURE 3 is an enlarged fragmentary perspective view looking at the front, left hand side and top of the apparatus, a rack being shown partially loaded and parts being broken away to clarifying the construction.

Referring particularly to FIGURES 1, 2 and 3, at the front and top of the apparatus are a pair of bearings 46 respectively mounted upon the members 16 and 23. Revolvably received by the bearings 46 are the opposite end portions of a shaft 48, which mounts a roller 50. Affixed to the shaft 48 is a disc 52 adjacent the left hand end of the roller 50. The disc 52 is provided with a lug 54. Also affixed to the shaft 48 is a pulley 56 adjacent the disc 52. Trained over the pulley 56 is a belt 58, which is also trained over the pulley 60 of an air motor 62, which air motor is mounted upon a bracket 64 carried by the member 23.

Referring particularly to FIGURES 1, 2, 3, 6 and 7, secured respectively to the posts 12 and 21 are a pair of bearings 66, which receive the opposite end portions 68 of a torison bar 70. Depending from each bar portion 68 and affixed thereto is an actuator arm 72. The lower end of each actuator arm is bifurcated, as at 74, and extending through the furcations is a pin 76. Carried by the pin 76 is the rear end portion of a pawl, generally designed 78. The fore end portion of the pawl is undercut to provide a straight edge 80 extending rearwardly and terminating in a curved edge 82 for a purpose to appear. The pawl is slotted, as at 84, and extending through the slot 84 is a rod 86. The rods 86 extend from opposite end portions of a tubular cloth holding bar 88, which is slotted, as at 90, to receive pins 92 for a purpose to appear. Affixed to each pawl 78 is a clip 94 through which extends a rod 96 connected to the bar 88. Fitted over the rod 96 is a compression spring 98 between the clip 94 and the bar 88.

Figure 6:
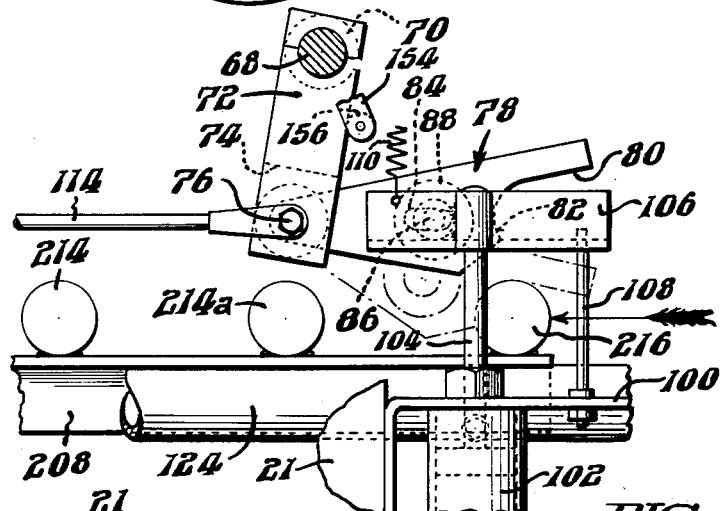
FIGURES 6 and 7 are enlarged fragmentary sections respectively looking from the right toward the left of the apparatus and from the front toward the rear thereof, showing a different operating condition.
Figure 7:
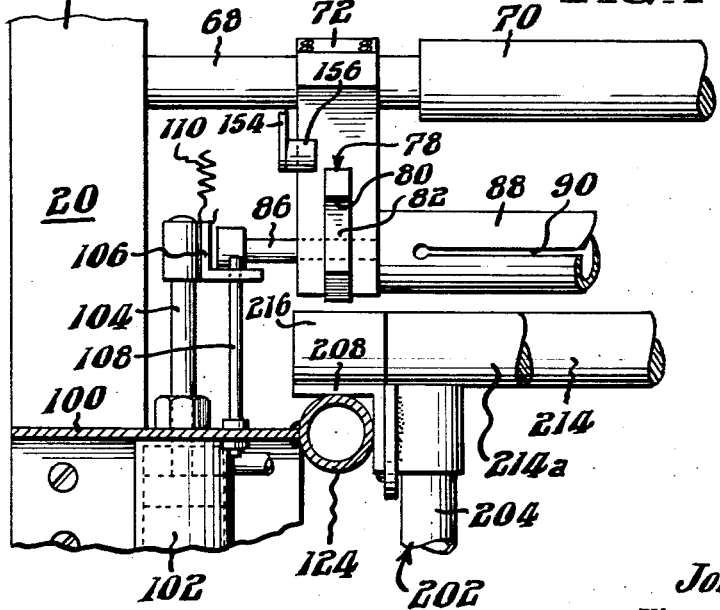

Referring particularly to FIGURES 3, 6 and 7, affixed to the post 21 is a bracket 100 from which depends an air cylinder 102. Working in the air cylinder is a rod 104, the upper end of which mounts an angle bar 106. A guide pin extends upwardly from the bracket 100 and slidably projects through an opening in the angle bar 106. The angle bar is connected to a tension spring 110 which extends upwardly and is anchored to a bracket 112 extending from the post 21.

Referring particularly to FIGURES 1, 2 and 3, connected to the pin 76, on the left hand side of the machine, is the fore end portion of a horizontally extending rod 114. The rear end portion of the rod 114 is connected to the piston 116 of an air cylinder 118, which is pivoted, as at 120, to a bracket 122.

Referring particularly to FIGURES 1 to 4 and 6 and 7, the apparatus is provided with a pair of guide bars 124 provided with curved fore ends 126 affixed to the brackets 100. The guide bars extend rearwardly for connection to brackets 128 extending from the posts 14 and 22. The terminal portions of the guide bars mount stop plates 130 for a purpose to appear. Affixed to the bracket 100, on the left hand side of the machine, is the fore end portion of a bar 132 which extends rearwardly for connection by a clip 133 to the bracket 128 for a purpose to appear.

Referring particularly to FIGURES 1 and 2, the member 26 mounts an electric box assembly 134 which has a start button 136, a stop button 138 and a manual feed button 140.

Referring particularly to FIGURES 1, 3 and 5, a limit switch 142 is mounted upon a block 144 which is slidable upon the bar 132, and which is locked in a selected position by a lock screw 146. The switch is provided with a rockable arm 148 mounting a roller 150.

Referring particularly to FIGURES 3, 6 and 7, carried by the bracket 112 is a microswitch 152 provided with a rockable arm 154 mounting a roller 156.

Referring particularly to FIGURE 3, in front of the disc 52 is a microswitch 158 provided with a rockable arm 160 mounting a roller 162, and associated with the microswitch 158 is a stepping relay 164.

Referring particularly to FIGURE 14, the electrical system includes main conductors L1 and L2. Across the conductors L1 and L2 is a line 166 in which is connected the manual feed button 140 and the solenoid 168 of the air motor 62. Across the manual feed button 140 is a line 170 in which is connected a pair of contacts R1–1. Also across the main conductors L1 and L2 is a line 172 in which are connected start switch 136, a stop switch 138, limit switch 142 and coil R1. Across the start switch 136 is a line 173 in which is connected a pair of contacts R1–2. Connected into the line 172, between stop switch 138 and limit switch 142, is an auxiliary conductor 174. Across the auxiliary conductor 174 and the main conductor L2 is a line 175 in which is connected a normally closed section 176 of the microswitch 152, a pair of normally closed contacts R2–1 and a solenoid 177. Across the solenoid 177 is a line 178 in which is connected a reset coil 179. Also across the auxiliary conductor 174 and the main conductor L2 is a line 180 in which is connected a normally open section 182 of the microswitch 152 and a solenoid 184. A line 186 across the auxiliary conductor 174 and the main conductor L2 has connected therein a pair of normally open contacts R2–2, a pair of normally closed contacts R3–1 and a coil R2. A line 188 is connected between the lines 180 and 186, as shown. A line 190 across the auxiliary conductor 174 and the main conductor L2 has connected therein the microswitch 158 and a counter coil 191, which is a part of the stepping relay 164. A line 193 across the auxiliary conductor 174 and the main conductor L2 has connected therein a selector switch, generally designated 192, which also is a part of the stepping relay 164. The switch 192 includes a selector arm 194, a series of conductors 196 and a stepping arm 198. Also connected in the line 193 is a coil R3.

Referring particularly to FIGURES 1, 3, 6 and 7, a rack used in conjunction with the apparatus, generally designated 200, is provided on each side thereof with a frame 202 including a post 204 at the front end of the rack and a post 206 at the rear end of the rack. The tops of the posts 204 and 206 are connected by a horizontally extending angle bar 208, and the lower ends of the posts 202 and 204 are connected by the horizontally extending member 210. The lower ends of the posts 204 are connected by a horizontally extending member 212, and the lower ends of the posts 206 are connected by a horizontally extending member 212. Extending across the top of the rack and having opposite end portions affixed respectively to the angle bars 208 are a series of laterally equally spaced festooner bars 214, and affixed to the fore ends of the bars 208 respectively are a pair of stub bars 216. The festooner rack is fitted with a set of casters 218. The web of material to be loaded upon the rack is designated 220.

Assuming that an empty rack 200 is in position in front of the apparatus, ready to be inserted thereinto for being loaded, there is no pressure in the cylinder 102 and therefore the rod 104 is extended and the angle 106 at the upper end thereof is held high by the spring 110. The rod 104 and the angle 106 are secured against turning about the axis of the rod 104 by the pin 108. The end of the rod 86 rests upon the angle 106 and thus the cloth holding bar 88 is held in elevated position. The pawls 77 are in elevated and retracted position, as shown in FIGURES 6 and 7. The rack 200 is pushed into the apparatus to the loading position. The rack moves on the casters 218, and angles 208 coact with guides 124 to control movement. As the rack 200 moves rearwardly the angle 208 on the left hand side of the machine engages the roller 150 and depresses arm 148 to close limit switch 142 to ready the apparatus for operation. The rack is fully inserted in the apparatus when the angles 208 engage the stop plates 130.

With the rack fully inserted in the apparatus, pressure is supplied to cylinder 102, whereupon the rod 104 is retracted and the angle 106 is lowered against the influence of spring 110. The cloth holding bar 88, under the influence of gravity, follows the angle 106 downwardly. The pawls 78 swing downwardly and rearwardly about pins 76 till their fore ends rest upon the stub bars 216. The straight edges 80 of the undercuts overlie the stub bars, which nest in the curved edges 82, as best shown in FIGURE 8.

The web 220, drawn from a roll or pile thereof, is trained over the rollers 44 and 50 and extends downwardly in front of the roller 50.

The manual feed button 140 is now depressed, whereupon the solenoid 168 is energized, which causes compressed air to be supplied to the motor 62. The belt 58 drives the feed roller 50 and the web is fed downwardly immediately behind the cloth holding bar 88 and in front of the bar 214a, as shown in FIGURE 8. When a sufficient length of web depends from the feed roller 50, the manual feed button 140 is released, whereupon solenoid 168 is deenergized and the air motor 62 ceases to operate.

Now the start button 136 is depressed, whereupon the coil R1 is energized, and the normally open contacts R1–1 and R1–2 are closed, in consequence of which the solenoid 168 is reenergized and motor 62 begins to operate to feed web 220 again. Contacts R1–2 hold the coil R1 energized when the switch 136 reopens.

When coil R1 is energized, conductor 174, solenoid 177 and reset coil 179 are energized. Solenoid 177 operates to supply pressure to air cylinder 118 for extending the piston 116 and its extension rod 114. Thus the actuator arms 72 swing forwardly and upwardly about the axis of the torsion bar 70, and the pawls 78 move forwardly, as a consequence of which the stub bars 216 are pushed forwardly, and the rack 200 is partially ejected from the apparatus, as shown in FIGURE 9. The web 220 now extends downwardly and forwardly from the feed roller 50 and is draped downwardly across the bar 214a in contact therewith. The selector switch arm 198 is moved to and held in its starting position, shown in FIGURE 14.

As the arms 72 reach their limit of angular movement the one on the left hand side of the machine engages the roller 156 on the arm 154 of the microswitch 152 and actuates the same. Switch section 182 closes momentarily and switch section 176 opens momentarily. When the switch section 176 opens, solenoid 177 and coil 179 are deenergized, as a consequence of which air pressure for extending the pawls 78 is removed. When section 182 closes, solenoid 184 and coil R2 are energized, whereupon normally closed contacts R2–1 are opened and normally open contacts R2–2 are closed to hold the coil R2 and solenoid 184 energized. Solenoid 184 operates to supply air pressure to cylinder 118 for retracting the piston 116 and its extension rod 114, whereupon the actuator arms 72 swing downwardly and rearwardly about the axis of the bar 70 back to their initial positions. Thus the pawls 78 are retracted and engage bar 214a instead of stub bars 216, as shown in FIGURE 10. At the same time pins 92 pierce the web, which snakes closely in between the bar 214a and cloth holding bar 88, as shown by dotted lines in FIGURE 10.

As more and more of the web is fed, a festoon forms behind the bar 214a, as shown in phantom in FIGURE 10. Each time the feed roller 50 revolves, the lug 54 engages roller 162 on arm 160 of microswitch 158, and the counter coil 191 of the reset relay 164 is energized This advances the arm 198 of the relay 192 one step. When the circuit is made through the selected conductor 196 of the switch 192, coil R3 is energized, whereupon normally closed contacts R3-1 are opened. Coil R2 is deenergized and normally open contacts R2-2 open. Solenoid 184 is deenergized, removing air pressure for retracting pawls 78.

When coil R2 is deenergized, normally closed contacts R2-1 close. Solenoid 177 and reset coil 179 are reenergized. When reset coil 179 is reenergized, arm 198 of switch 192 is moved back to its initial position, whereupon the next cycle begins.

Thus the rack is advanced, i.e., ejected from the apparatus, step by step, a festoon forming between each successive pair of bars 214. One festoon is formed per cycle of the machine, as shown in FIGURES 8 to 13.

When the rearmost bar 214 has been thrust forwardly by the pawls 78, the roller 150 on the arm 148 of the switch 142 is released by the angle 208, whereupon the switch 142 opens and coil R1 is deenergized. Contacts R1-1 and R1-2 open, solenoid 168 is deenergized and the motor 62 ceases operation. Now the entire apparatus has been restored to its initial condition.

The festooned section of the web is now cut from the main web supply. The loaded rack 200 is pulled out through the front of the apparatus, and when the angles 208 move out from under rods 86, the pawls 78 and bar 88 swing downwardly and rearwardly about pins 76, and the rod 86 on the left hand side of the machine engages angle 106. The air pressure in cylinder 102 is now bled therefrom, and the spring 110 takes over, raising angle 106, bar 88 and pawls 78 so that the next rack to be loaded may be pushed into the apparatus.

It will be understood, of course, that the present invention, as described and shown, is susceptible to various changes and modifications which may be made without any departure from the general principles or real spirit of the invention. Accordingly, it is intended to claim the present invention broadly, as well as specifically, as indicated in the appended claims.

Having thus described my invention, I claim as follows:

1. In combination, apparatus including means for feeding a web of material, a series of horizontally spaced means positioned for receiving a length of said web material payed out by said web feeding means, means for advancing said web receiving means in predetermined timed relation to operation of said web feeding means whereby to progressively separate the same from said web feeding means during formation of a complement of festoons each depending freely from said web receiving means between a pair thereof, and means responsive to separation of said web receiving means from said web feeding means for automatically terminating operation of said advancing and web feeding means.

2. In combination, apparatus including means for feeding a web of material, and a series of horizontally spaced means separable as a unit from said apparatus and adapted for receiving a length of said web material payed out by said web feeding means, said apparatus including means for advancing said web receiving means in predetermined timed relation to operation of said web feeding means whereby to progressively separate the same from said apparatus during formation of a complement of festoons each depending freely from said web receiving means between a pair thereof, said advancing means including reciprocable means engageable with horizontally spaced portions of said unit, and means for actuating said reciprocable means for successively engaging said horizontally spaced portions of the unit, and said apparatus also including a horizontally extending member disposed in front of said web and mounted upon said reciprocable means for movement therewith, said member being operable upon retraction of said reciprocable means to lay said web over one of said horizontally spaced means preparatory to the formation of the next festoon.

3. In combination, apparatus including means for feeding a web of material, and a series of horizontally spaced means separable as a unit from said apparatus and adapted for receiving a length of said web material payed out by said web feeding means, said apparatus including means for advancing said web receiving means in predetermined timed relation to operation of said web feeding means whereby to progressively separate the same from said apparatus during formation of a complement of festoons each depending freely from said web receiving means between a pair thereof, said advancing means including reciprocable means engageable with horizontally spaced portions of said unit, and means for actuating said reciprocable means for successively engaging said horizontally spaced portions of the unit, and said apparatus also including a horizontally extending member disposed in front of said web and yieldably mounted upon said reciprocable means for movement therewith, said member being operable upon retraction of said reciprocable means to lay said web over one of said horizontally spaced means preparatory to the formation of the next festoon and to hold it there during formation of said festoon.

4. In combination, apparatus including a frame structure open in the front thereof, a roller at the front of said structure operable for continuously feeding a web of material downwardly along the open front of said frame structure, a wheeled rack inserted into said frame structure through the open front thereof and mounting a series of horizontally spaced bars extending across the top of said rack generally parallel to said feed roller, mechanism for ejecting said rack from said apparatus including a pair of arms rockably mounted respectively upon opposite sides of said frame, a pair of pawls pivotally connected respectively to said arms and adapted for engaging said bars, and means for actuating said arms and reciprocating said pawls in predetermined timed relation to the operation of said feed roller whereby to progressively eject said rack from said frame structure through the open front thereof with a complement of festoons each depending freely from said rack between a pair of said bars, and a bar positioned in front of the downwardly extending web generally parallel to said feed roller and yieldably mounted upon said arms for movement therewith, said bar being operable upon retraction of said pawls to lay said web over one of said rack bars preparatory to the formation of the next festoon and to hold it there during formation of said festoon.

References Cited in the file of this patent

UNITED STATES PATENTS

| | | |
|---|---|---|
| 44,281 | Chaffee | Sept. 20, 1864 |
| 2,842,268 | Gumplo | July 8, 1958 |
| 2,996,230 | Templitz | Aug. 15, 1961 |
| 3,008,620 | Hausner et al. | Nov. 14, 1961 |

FOREIGN PATENTS

| | | |
|---|---|---|
| 291,162 | Switzerland | June 15, 1953 |